United States Patent [19]
Tani et al.

[11] Patent Number: 5,081,077
[45] Date of Patent: Jan. 14, 1992

[54] PROCESS FOR PRODUCING SINTERED BODY OF METAL BORIDE AND RAW MATERIAL COMPOSITION THEREFOR

[75] Inventors: Toshihiko Tani, Nagoya; Shigetaka Wada, Kuwana, both of Japan

[73] Assignee: Kabushiki Kaisha Toyota Chuo Kenkyusho, Aichi, Japan

[21] Appl. No.: 681,645

[22] Filed: Apr. 8, 1991

Related U.S. Application Data

[63] Continuation of Ser. No. 263,872, Oct. 28, 1988, abandoned.

[30] Foreign Application Priority Data

Oct. 29, 1987 [JP] Japan .................................. 62-274343
Jul. 20, 1988 [JP] Japan .................................. 63-180616

[51] Int. Cl.$^5$ ............................................. C04B 35/58
[52] U.S. Cl. .................................. 501/96; 501/93; 501/94; 264/65
[58] Field of Search ............... 501/91, 93, 96, 94; 264/65

[56] References Cited

U.S. PATENT DOCUMENTS

| | | | |
|---|---|---|---|
| 4,439,382 | 3/1984 | Joo et al. | 204/67 X |
| 4,500,643 | 2/1985 | Gesing et al. | 501/98 X |
| 4,693,989 | 9/1987 | Sane | 501/96 |
| 4,812,425 | 3/1989 | Walker, Jr. | 501/96 |

FOREIGN PATENT DOCUMENTS 59-162289 9/1984 Japan.

OTHER PUBLICATIONS

Baumgartner, "Sintering and Property of TiB$_2$ Made from Powder Synthesized in a Plasma-Arc Heater", *J. Am. Ceram. Soc.*, vol. 67, p. 207 (1984).

Hayami et al, "Effects of Applied Pressure on Hot-Pressing of ZrB$_2$", Yogyo-Kyokai-shi, 88[8]1978, pp. 352-359.

Watanabe et al, "Densification Mechanism of TiB$_2$-1% CoB and TiB$_2$-5% TaB$_2$-1% CoB$_2$ Systems", *J. Jap. Soc. Powder and Powder Metallurgy*, vol. 33, p. 38 (1986).

Kalisch et al., "Strength, Fracture Mode, and Thermal Stress Resistance of HfB$_2$ and ZrB$_2$", *J. Am. Ceram. Soc.*, vol. 52, pp. 30-36 (1969).

*Primary Examiner*—Karl Group
*Attorney, Agent, or Firm*—Oblon, Spivak, McClelland, Maier & Neustadt

[57] ABSTRACT

A process for producing a metal boride sintered body having a density of at least 90% of the theoretical density and a raw material composition therefor. The raw material composition is composed of a metal oxide, a metal carbide, and boron carbide, the amount of boron carbide being 5 to 20% more than the amount stoichiometrically required to form a metal boride by reaction of boron in the boron carbide with the metal element(s) in the metal oxide and metal carbide. By using this composition, it is possible to produce a metal boride sintered body having high density and high hardness without adding a sintering auxiliary or carbon and using a very high pressure.

15 Claims, 2 Drawing Sheets

PROCESS FOR PRODUCING SINTERED BODY OF METAL BORIDE AND RAW MATERIAL COMPOSITION THEREFOR

This application is a continuation of application Ser. No. 263,872, filed on Oct. 28, 1988, now abandoned.

BACKGROUND OF THE INVENTION

1. Field of the Invention

The present invention relates to a process for producing a sintered body of a metal boride and also to a raw material composition therefor.

2. Description of the Related Art

Sintered bodies of metal borides such as $TiB_2$ and $ZrB_2$ find use as wear-resistant elements, cutting tools, corrosion-resistant refractory materials, etc. owing to their characteristic properties such as high hardness, high strength, and high electrical conductivity.

Sintered bodies of metal borides are usually produced from a metal boride powder containing a sintering auxiliary by hot press sintering. For example, Watanabe et al. obtained a nearly voidless $TiB_2$ sintered body from a $TiB_2$ powder containing 1% CoB by hot-pressing at 1700° C. for 30 min. (See "Funtai Oyobi Funmatsu Yakin" (J. Jap. Soc. Powder and Powder Metallurgy), vol. 33 (1986), p. 38.)

Although there have been proposed many sintering auxiliaries such as FeB, $Ni_4B_3$, and NiB for $TiB_2$, they impair the inherent properties of $TiB_2$. For example, they increase the coefficient of thermal expansion and density and decrease hardness and thermal conductivity.

For an ordinary commercial powder to be compacted without the aid of an sintering auxiliary, heating under a very high pressure is required. In fact, a compact sintered body of $HfB_2$ or $ZrB_2$ is obtained by hot pressing at 1800° C. and 120000 psi (ca. 0.8 GPa). (See J. Am. Ceram. Soc., vol. 52, No. 1, pp. 30–36.) A disadvantage of this process using such a high mechanical pressure is that it can be applied only to the production of small sintered bodies of simple shape and cannot be applied to the production of sintered bodies of practical use. It has also been reported that the hot pressing of $ZrB_2$ requires a high pressure in excess of 40 MPa at 2050° C. if it is to have a density higher than 95%. (See Hayami et al., "Yogyo Kyokaishi" (Journal of Ceramics Industry Society), vol. 86, No. 2 (1978), pp. 352–359.)

There has been reported a process for producing a $TiB_2$ sintered body by sintering under normal pressure a $TiB_2$ powder of ultrafine particles having a specific surface area as high as 7 $m^2/g$ which is produced by gas phase reaction in a plasma arc. (See J. Am. Ceram. Soc., 67 (1984), p. 207.) A disadvantage of this process is that such a fine powder is so pyrophoric that it should be handled in an inert gas atmosphere, which adversely affects the productivity.

On the other hand, there is disclosed in Japanese Patent Laid-open No. 162289/1984 a process for producing a compact $TiB_2$ sintered body by uniformly mixing a titanium-containing powder, a boron-containing powder, and a carbon powder, keeping the mixture at 1600°–2200° C. for 5–45 minutes, and then keeping the mixture at 2250°–2600° C. for 10–60 minutes.

A disadvantage of this process is that it yields a $TiB_2$ sintered body containing a large amount of residual carbon which leads to the following shortcomings.

(a) The sintered body has a low hardness and strength on account of the residual carbon.
(b) The sintered body is poor in oxidation resistance because the residual carbon burns at high temperatures.
(c) In addition, the abundant carbon in the raw material makes it difficult to produce a uniform mixture when the raw materials are dry-mixed. In the case where the raw materials are wet-mixed, the segregation of carbon is liable to take place during drying because carbon particles easily move in the slurry.

Japanese Patent Laid-Open No. 169983/1984 refers to a formation of $TiB_2$ by reacting $TiO_2$, TiC and $B_4C$. According to the inventor's experiments, however, the sintering of a metal oxide, a metal carbide and boron carbide mixed in the stoichiometric ratio do not result in the formation of a metal boride having a density higher than 90% of the theoretical density. This is probably due to shortage of boron which is caused because part of boron is evaporated in the form of boron oxide from the Ti-B-O compound produced during the sintering.

The metal boride in this publication can be obtained as follows.

A. A compressed body of raw materials is heated until carbon monoxide is generated and a porous body is formed.
B. Raw materials are heated in a vacuum or in an inert atmosphere below a temperature at which the formation of a metal boride takes place. The resulting materials are crushed uniformly and then molded by pressing or pelleting. Finally, they are reacted to form a metal boride.

These processes A and B fail to provide a sintered body having high density. Further, the process B requires a step of taking the once synthesized metal boride out of the sintering furnace, followed by the step of crushing. This causes serious contamination of the powder and adversely affects the degree of sintering. The resultant metal boride contains interconnected pores in the amount as large as 10–45 vol %. Such a porous metal boride cannot find use as high-performance mechanical components.

SUMMARY OF THE INVENTION

The present invention was completed to overcome the above-mentioned disadvantages involved in the conventional technology. It is an object of the present invention to provide a process for producing a metal boride sintered body having outstanding mechanical properties without using a sintering auxiliary or carbon and a very high pressure. It is another object of the present invention to provide a raw material composition to be used for said process.

The gist of the present invention resides in a process for producing a metal boride sintered body which comprises sintering a raw material composition composed of a metal oxide, a metal carbide, and boron carbide, the amount of boron carbide being 5 to 20% more than the amount stoichiometrically required to form a metal boride by reaction of boron in the boron carbide with the metal element(s) in the metal oxide and metal carbide.

According to the present invention, it is possible to produce a metal boride sintered body without adding a sintering auxiliary or carbon and using a very high pressure. In other words, it is possible to synthesize a metal boride without the addition of carbon according to the following reaction formula, by reacting a metal oxide ($M^1C_x$), a metal carbide ($M^2O_y$), and boron carbide ($B_4C$). Further, it is possible to supplement the shortage of boron caused during sintering by using excess amount of boron carbide as mentioned above.

$$lM^1C_x + mM^2O_y + nB_4C \rightarrow M^1{}_lM^2{}_mB_{4n} + m \cdot yCO \uparrow$$

(where $M^1$ and $M^2$ denote metal elements which may be the same or different from each other; and l, m, n, x, y, and z denote numerals which are defined by $l \cdot x + n = m \cdot y$.)

Upon sintering, the mixture yields a boride which has such a good sinterability that it can be sintered without the aid of a sintering auxiliary and high pressure.

In addition, the above-mentioned raw material composition yields a compact metal boride sintered body having outstanding mechanical and thermal properties.

The above and other objects, features, and advantages of the present invention will become more apparent from the following description when taken in conjunction with the accompanying drawings in which a preferred embodiment of the invention is shown by way of illustrative example.

DETAILED DESCRIPTION OF THE INVENTION

Figure 1:
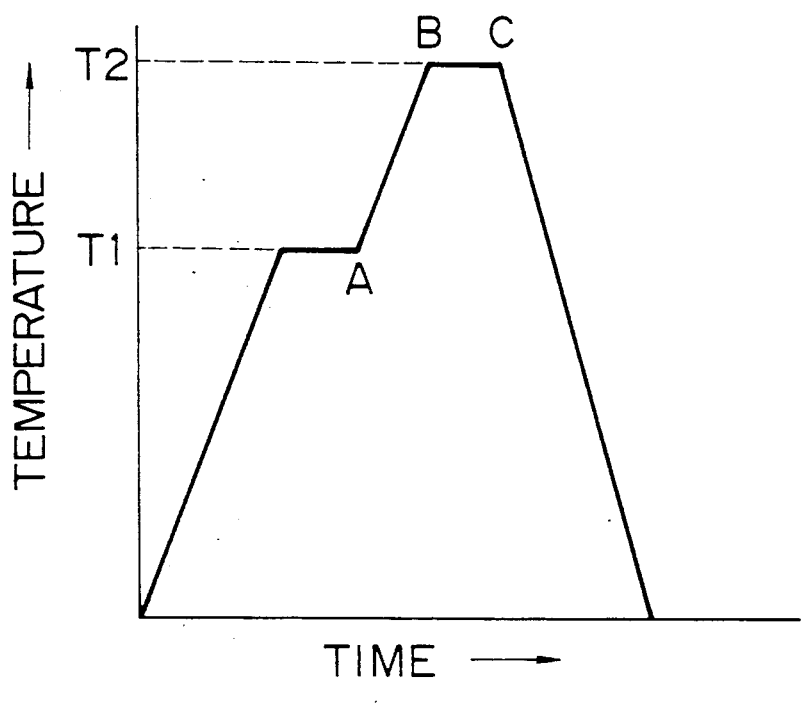
FIG. 1 shows a sintering pattern in the case where mechanical pressure is used.

According to the present invention, the raw material composition for the metal boride is a mixture composed of a metal oxide, a metal carbide, and boron carbide, the amount of boron carbide being 5 to 20% more than the amount stoichiometrically required to form a metal boride by a reaction of boron in the boron carbide with the metal element(s) in the metal oxide and metal carbide. The raw material composition should preferably be used in the form of powder for the production of the sintered body.

The metal element for the metal boride to be produced may be such as Ti, Zr, Hf, V, Nb, Ta, Cr, Mo, or W. These metals may be used alone or in combination. In the case where the metals are used in combination, the metal boride thereof may be a complex boride or a double boride. In the case where a single metal boride is to be produced, the kind of metal in the metal oxide in the raw material composition should be the same as that in the metal carbide. The metal boride should preferably be diboride ($MB_2$) or pentaboride ($M_2B_5$).

The metal oxide may be a single oxide such as $TiO_2$, $ZrO_2$, $Cr_2O_3$, and $MoO_3$; a solid-solution oxide such as $(Ti,Zr)O_2$ and $(Nb,Ta)_2O_5$; or a double oxide such as $TiO_2 \cdot ZrO_2$ and $TiO_2 \cdot Nb_2O_5$. These metal oxides may be used alone or in combination with one another.

The metal carbide may be a single carbide such as TiC, ZrC, and NbC; a carbide solid solution such as (Ti,Zr)C; or a double carbide. These metal carbides may be used alone or in combination with another.

When the raw material composition is used in powder form, the average particle diameter of the metal oxide powder, metal powder, and boron carbide powder should preferably be smaller than 10 μm so that the reaction to form the metal boride proceeds readily. Moreover, the finer the powder, the more reactive the powder. For example, a very reactive raw material composition is prepared by mixing a metal carbide and boron carbide with a metal oxide in the form of its precursor such as alkoxide solution or in the form of suspension of submicron particles synthesized from such a liquid precursor.

Theoretically, the mixing ratio of the metal oxide, metal carbide, and boron carbide is stoichiometric. Since the reaction formula is represented by:

$$lM^1C_x + mM^2O_y + nB_4C \rightarrow M^1{}_lM^2{}_mB_{4n} + m \cdot yCO \uparrow$$

(where $M^1$ and $M^2$ denote metal elements which may be the same or different from each other; and l, m, n, x, y, and z denote numerals which are defined by $l \cdot x + n = m \cdot y$.)

the mixing molar ratio of $M^1C_x$, $M^2O_y$, and $B_4C$ is l:m:n. For example, in the case where $TiB_2$ is synthesized from TiC, $TiO_2$, and $B_4C$, the reaction proceeds according to the following reaction formula:

$$TiC + TiO_2 + B_4C \rightarrow 2TiB_2 + 2CO \uparrow \quad (1)$$

therefore, the molar ratio of TiC, $TiO_2$, and $B_4C$ is 1:1:1. Likewise, in the case where $VB_2$ is synthesized from $V_2O_5$, VC, and $B_4C$, the reaction proceeds according to the following reaction formula:

$$8VC + 3V_2O_5 + 7B_4C \rightarrow 14VB_2 + 15CO \uparrow \quad (2)$$

therefore, the molar ratio of VC, $V_2O_5$, and $B_4C$ is 8:3:7. This holds true of the synthesis of double borides or boride solid solutions. For example, $(Ti,Zr)B_2$ may be synthesized according to the following reaction formulas.

$$TiO_2 + ZrC + B_4C \rightarrow 2(Ti,Zr)B_2 + 2CO \uparrow \quad (3)$$

$$TiC + ZrO_2 + B_4C \rightarrow 2(Ti,Zr)B_2 + 2CO \uparrow \quad (4)$$

$$(Ti,Zr)O_2 + (Ti,Zr)C \rightarrow 2(Ti,Zr)B_2 + 2CO \uparrow \quad (5)$$

Therefore, theoretically, these reaction can be accomplished by mixing the metal carbide, metal oxide, and metal boride in the soichiometric ratio. Practically, however, the amount of each component actually required for the reaction is different from the soichiometric amount for reasons mentioned below.

(1) For metal oxide

The metal oxide partly disappears by thermal decomposition or sublimation during sintering and such a portion has nothing to do with the formation or the metal boride. This is more remarkable in pressureless sintering than in hot pressing. Moreover, this is more remarkable in the case of the metal oxide having high vapor pressure, such as vanadium oxide or chromium oxide. For the reaction under such condition, it is desirable to increase the amount of the metal oxide more than the stoichiometric amount, so that free carbon will not remain in the sintered body.

(2) For metal carbide

The metal carbide is usually covered with an oxide surface, and this leads to the fact that the actual amount of the metal carbide is often smaller than the measured amount and the difference is required to be supplemented. On the other hand, there is an instance where the metal carbide powder carries a large amount of free carbon on its surface. In such an instance, the carbon to oxygen ratio is higher than necessary in the mixture powder and hence it is desirable to reduce the amount of the metal carbide accordingly.

(3) For boron carbide

Boron carbide should be added in excess amount since it is a single source of boron and since boron is apt to disappear during the reaction.

The amount of boron carbide to be added should be 5% more than the amount needed for formation of a metal boride by reaction of boron in the boron carbide and a metal or metals in the metal oxide and metal carbide. A metal boride sintered body having a density higher than 90% of the theoretical density (hereinafter expressed as relative density) will not be obtained with insufficient amount of boron carbide. On the other hand, the use of boron carbide in excess amount of above 20% will reduce the value of density due to the nonnegligible amount of residual $B_4C$ in the sintered body.

For example, the stoichiometric molar ratio for formation of a dense $TiB_2$ sintered body from $TiO_2$, $TiC$ and $B_4C$ is 1:1:1. However, the optimum mixing ratio for $TiO_2$ and $TiC$ will be within the range in which one is not more than 1.2 times the other. Further, when the total molar amount of $TiO_2$ and $TiC$ is a, the optimum additive molar amount of $B_4C$ is in the range of 0.525a to 0.6a. This will be expressed as follows.

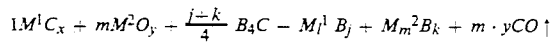

The optimum molar ratio of $M^1C_x/M^2O_y$ is in the range of $1/1.2$ m to $1.2$ $1/m$, and the required molar amount of $B_4C$ is in the following range when the amounts of $M^1C_x$ and $M^2O_y$ are a mole and b mole, respectively:

$$1.05\left(\frac{aj}{4l} + \frac{bk}{4m}\right) \text{ to } 1.2\left(\frac{aj}{4l} + \frac{bk}{4m}\right)$$

where $M^1$ and $M^2$ may be the same or different.

With such a mixing ratio, it is possible to provide the raw material composition according to the present invention and to obtain a metal boride sintered body having a relative density higher than 90%.

The mixing of the raw materials may be accomplished by either dry process or wet process, with the latter being preferable for a uniform mixture. Wet mixing may be accomplished in water or an organic solvent as the mixing medium. The resulting mixture may be dried by heat drying, spray drying, freeze drying, or suction filtration by suction. The drying may be accomplished in a vacuum, an inert atmosphere, an oxidizing atmosphere, or a reducing atmosphere. As mentioned above, the process of the invention permits mixing in water and drying in the air. This means that a large amount of powder can be treated using a spray drier of ordinary type (not explosionproof type).

The molded item of a metal boride can be conveniently produced by molding the raw material composition prior to sintering. The molding may be accomplished by any method commonly used for ceramics molding such as slip casting, injection molding, extrusion molding, die pressing, isostatic pressing, dough pressing, and doctor blade.

The molded raw material composition is subsequently sintered in a vacuum or a non-oxidizing atmosphere, which prevents the oxidation of the raw material composition and accelerates the sintering of the metal boride.

The sintering temperature varies depending on the kind and purity of the raw material composition. It is in the range of 1700° to 2300° C. for sintered bodies having a density higher than 90% of the theoretical density.

In the process of sintering, the metal oxide, metal carbide, and boron carbide react with one another to form a metal boride. The reaction to form $TiB_2$ from $TiO_2$, $TiC$, and $B_4C$ according to the reaction formula (1) above can proceed rightward at about 930° C. or above, at which the change of standard free energy is negative. Also, the reaction to form $ZrB_2$ from the mixture of $ZrC$, $ZrO_2$, and $B_4C$ according to the following reaction formula:

$$ZrC + ZrO_2 + B_4C \rightarrow 2ZrB_2 + 2CO \uparrow \qquad (6)$$

can proceed rightward at about 1160° C. or above, at which the change of standard free energy is negative.

Therefore, to complete these reactions, the reactants should be kept for a certain period at temperatures mentioned above. The reaction can be accelerated if the reaction system is evacuated to remove the carbon monoxide gas evolved.

The reaction is generally performed at a temperature between 1000° C. and 1800° C. (preferably between 1100° C. and 1600° C.) for at least one hour in an evacuated state. For example, $TiB_2$ is formed when the reactants are heated at about 1400° C. for 1 to 4 hours, and $ZrB_2$ is formed when the reactants are heated at 1500° C. for 1 to 4 hours. Particles of the metal boride thus formed are free of oxide surface layer and are so active that they can be densified without the aid of sintering auxiliary.

As mentioned above, the first step of sintering forms the metal boride through the reaction of the metal oxide, metal carbide, and boron carbide, and the second step of sintering densifies the active metal boride.

Sintering may be accomplished by any means such as pressureless sintering and pressure sintering.

In pressure sintering, mechanical pressure or isostatic pressure by an inert gas is applied to the raw material composition according to the present invention after preheating it. The resultant metal boride sintered body will have a relative density higher than 96%. Application of pressure before the formation of a metal boride is not desirable because it will prevent the generation of a carbon monoxide gas and thus disturb the reaction. As a result, unreactants will remain and the sintered body will have poor mechanical properties.

Mechanical pressure to be applied may be an uniaxial pressure or polyaxial pressure. It should preferably be at least 10 MPa so that a sintered body will have a relative density higher than 96%. Isostatic pressure should preferably be atmospheric pressure of at least 50 MPa in an HIP device so as to obtain a relative density higher than 96%.

Figure 2:
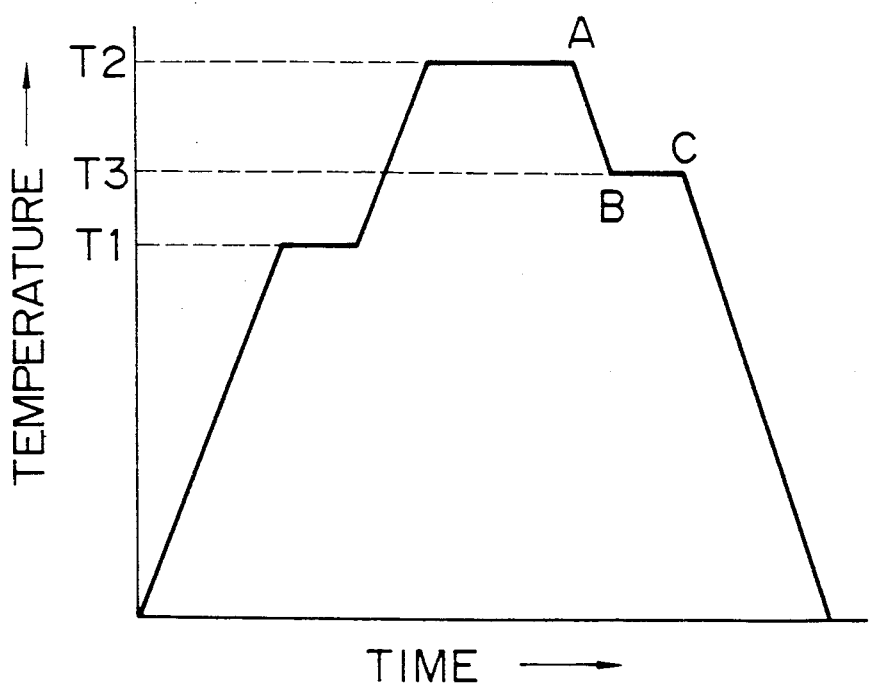
FIG. 2 shows a sintering pattern in the case where inert gas pressure is used.

FIG. 1 shows a sintering pattern when mechanical pressure is used. FIG. 2 shows a sintering pattern when inert gas pressure is used. In FIG. 1, the reaction to form a metal boride is completed at a temperature $T_1$ (1100°–1600° C.). Then the temperature is raised to $T_2$ (1700°–2300° C.) in a vacuum or a non-oxidizing atmosphere. Application of mechanical pressure should start between A and B and should continue at least up to C. In FIG. 2, the reaction is completed at a temperature T₁ (1100°–1600° C.). Then, the temperature is raised to T₂ (1700°–2300° C.) in a vacuum or a non-oxidizing atmosphere and presintering is continued until almost all open pores in the sintered body disappear. Thereafter inert gas is introduced into the furnace between A and B, and the application of pressure is continued while the sintered body is kept at a temperature T₃ (1600°–2000° C.) and at least up to C.

The sintered body of metal boride obtained by pressureless sintering may undergo hot isostatic press treatment (HIP), which reduces the ratio of closed pores in the sintered body and makes the sintered body denser. Alternatively, the compact, in which the reaction is completed by preheating, may undergo capsule HIP after encapsulation in glass.

As mentioned above, mechanical pressure or isostatic pressure should preferably be applied after the metal boride is formed.

The sintered body of metal boride formed according to the present invention has excellent mechanical properties such as a high purity, high hardness, high strength, and high electrical conductivity and also has superior thermal properties. Therefore, it will find use as wear-resistant elements, cutting tools, and corrosion-resistant refractory material.

The invention will be explained with reference to the following examples.

EXAMPLE 1

The raw material composition was prepared from TiO₂ powder (rutile type having an average particle diameter of 0.4 μm), TiC powder (having an average particle diameter of 1.5 μm), and B₄C powder (having an average particle diameter of 1.5 μm) according to the mixing ratio shown in Table 1. The components were mixed using a ball mill containing water as a mixing medium. The resulting mixture was dried by a spray drier. The dried powder was die-pressed at 300 kg/cm², followed by cold isostatic pressing at 3000 kg/cm². The compact was sintered under normal pressure in a carbon resistance furnace. The furnace was evacuated during heating and the compact was kept at 1400° C. for 4 hours. Then, argon gas was admitted into the furnace, and the temperature was raised again and the compact was kept at 2100° C. for 4 hours under the atmosphere (1 atm) of argon. Thus the sintering was completed. (Samples Nos. 1 to 6.)

For comparison, sintered bodies were prepared from the composition with the mixing ratio outside the range in the present invention. (Samples Nos. C1 to C4.) Further, TiB₂ sintered bodies were prepared in the same manner as above from TiB₂ powder (having an average particle diameter of 4 μm) alone or TiB₂ powder and B₄C powder (having an average particle diameter of 1.5 μm) as shown in Table 1. (Samples Nos. C5 to C7.)

The 13 kinds of TiB₂ sintered bodies shown in Table 1 were examined for relative density, Vickers hardness (under a 500 g load), and crystal phase. The results are shown in Table 1.

TABLE 1

| Sample No. | Raw Material Composition (mol) | | | | Relative density (%) | Crystal phase | Hardness (GPa) |
|---|---|---|---|---|---|---|---|
| | TiO₂ | TiC | B₄C | TiB₂ | | | |
| 1 | 1.0 | 1.0 | 1.05 | 0 | 93.0 | TiB₂ | 26.8 |
| 2 | 1.0 | 1.0 | 1.2 | 0 | 93.2 | TiB₂ + B₄C | 26.5 |
| 3 | 1.0 | 1.1 | 1.2 | 0 | 93.1 | TiB₂ | 26.2 |
| 4 | 1.0 | 1.2 | 1.2 | 0 | 92.7 | TiB₂ | 24.9 |
| 5 | 1.1 | 1.0 | 1.2 | 0 | 92.5 | TiB₂ | 25.3 |
| 6 | 1.2 | 1.0 | 1.2 | 0 | 91.6 | TiB₂ | 23.1 |
| C1 | 1.0 | 1.0 | 1.3 | 0 | 89.6 | TiB₂ + B₄C | 20.4 |
| C2 | 1.0 | 1.3 | 1.0 | 0 | 85.8 | TiB₂ + TiC | 19.7 |
| C3 | 1.3 | 1.0 | 1.0 | 0 | 82.1 | TiB₂ | 17.8 |
| C4 | 1.0 | 1.0 | 1.0 | 0 | 88.5 | TiB₂ | 19.4 |
| C5 | 0 | 0 | 0 | 1.0 | 62.3 | TiB₂ | —* |
| C6 | 0 | 0 | 0.1 | 1.0 | 63.5 | TiB₂ + B₄C | —* |
| C7 | 0 | 0 | 0.2 | 1.0 | 65.0 | TiB₂ + B₄C | —* |

*not measured.

It is noted from Table 1 that the sintered bodies according to Examples of the present invention, having the relation between the molar amount of B₄C ($M_{B_4C}$) and that of TiO₂ and TiC ($M_{TiO_2}$ and $M_{TiC}$):

$$\frac{1.05}{2}(M_{TiO_2} + M_{TiC}) \leq M_{B_4C} \leq \frac{1.2}{2}(M_{TiO} + M_{TiC})$$

show a higher density (above 90% of the theoretical density) and a higher hardness (above 23 GPa), as compared with Comparative Examples not having the aforementioned relation or obtained by directly hot pressing TiB₂.

The samples according to the present invention remained unchanged in hardness after heating at 800° C. for 200 hours in the air.

The sintered body of sample No. 1 was subjected to HIP treatment at 1800° C. for 1 hour in argon gas under a pressure of 2000 kg/cm². As the result, the relative density (93%) increased to 98.2% and the hardness (26.8 GPa) also increased to 29.6 GPa.

COMPARATIVE EXAMPLE

The raw material composition was prepared from TiO₂ powder (having an average particle diameter of 0.4 μm), B₄C powder (having an average particle diameter of 1.5 μm), and carbon powder (carbon black having an average particle diameter of 0.02 μm) at a mixing ratio of 2:1:3.6 (by mol). The components were mixed, followed by molding and pressureless sintering, in the same manner as in Example 1. There was obtained a sintered body having a relative density of 91.4%, a crystal phase containing 7 vol % of carbon in addition to TiB₂, and a hardness of only 18.2 GPa. Upon heating at 800° C. for 200 hours in the air, the sample decreased in hardness to 17.1 GPa on account of the combustion of carbon in the vicinity of the surface.

EXAMPLE 2

The dried powder of the raw material composition of Samples Nos. 1 to 6 was die-pressed at 200 kg/cm². The molded body was heated in a graphite die in the hot pressing device and sintered in a vacume at 1400° C. for 4 hours without applying mechanical pressure. The temperature was raised again under the mechanical uniaxial pressure of 20 MPa while introducing argon gas. A sintered body was finally obtained by hot pressing at 2000° C. for 4 hours in an argon atmosphere (1 atm). (Samples Nos. 7 to 12.)

For comparison, TiB₂ sintered bodies were prepared in the same manner as above from TiB₂ powder (having an average particle diameter of 4 μm) alone or TiB₂ powder and $B_4C$ powder (having an average particle diameter of 1.5 μm) as shown in Table 2. (Samples Nos. C8 to C10.)

The 9 kinds of $TiB_2$ sintered bodies shown in Table 2 were examined for relative density, Vickers hardness (under a 500 g load), and crystal phase. The results are shown in Table 2.

TABLE 2

| Sample No. | Raw Material Composition (mol) | | | | Relative density (%) | Crystal phase | Hardness (GPa) |
| --- | --- | --- | --- | --- | --- | --- | --- |
| | $TiO_2$ | TiC | $B_4C$ | $TiB_2$ | | | |
| 7 | 1.0 | 1.0 | 1.05 | 0 | 99.5 | $TiB_2$ | 32.1 |
| 8 | 1.0 | 1.0 | 1.2 | 0 | 99.0 | $TiB_2 + B_4C$ | 31.7 |
| 9 | 1.0 | 1.1 | 1.2 | 0 | 99.3 | $TiB_2$ | 31.8 |
| 10 | 1.0 | 1.2 | 1.2 | 0 | 99.2 | $TiB_2$ | 30.4 |
| 11 | 1.1 | 1.0 | 1.2 | 0 | 98.6 | $TiB_2$ | 29.0 |
| 12 | 1.2 | 1.0 | 1.2 | 0 | 97.0 | $TiB_2$ | 27.9 |
| C8 | 0 | 0 | 0 | 1.0 | 83.0 | $TiB_2$ | 18.0 |
| C9 | 0 | 0 | 0.1 | 1.0 | 87.2 | $TiB_2 + B_4C$ | 18.2 |
| C10 | 0 | 0 | 0.2 | 1.0 | 87.0 | $TiB_2 + B_4C$ | 18.3 |

It is noted from Table 2 that the relative density of the sintered bodies according to the present invention was further increased by subjecting them to hot pressing. On the other hand, the relative density of comparative sintered bodies was merely less than 90% after the treatment.

Further, the same raw material composition as that of Sample No.1 was sintered in the HIP furnace under the same conditions as those of Sample No. 1 in Table 1, except that the furnace was cooled to a temperature of 1800° C. and HIP treatment was carried out for 1 hour under the atmosphere (200 MPa) of argon. As the result, the relative density (93%) increased to 99.0% and the hardness (26.8 GPa) also increased to 30.2 GPa.

EXAMPLE 3

The raw material composition was prepared from $ZrO_2$ powder (monoclinic type having an average particle diameter of 4 μm), ZrC powder (having an average particle diameter of 1.5 μm), and $B_4C$ powder (having an average particle diameter of 1.5 μm) at a mixing ratio of 1:1:1.1 (by mol). The components were mixed using a ball mill containing water as a mixing medium. The resulting mixture was molded and sintered at normal pressure in the same manner as in Example 1, except that it was held at 1500° C. in a vacuum and sintering was performed at 2000° C. (Sample No. 13.)

For comparison, a $ZrB_2$ sintered body was prepared in the same manner as above from $ZrB_2$ powder (having an average particle diameter of 2 μm). (Sample No. C11.)

The resulting $ZrB_2$ sintered bodies were examined for relative density, crystal phase, and Vickers hardness in the same manner as in Example 1. The results are shown in Table 3.

TABLE 3

| Sample No. | Raw Material Composition (mol) | | | | Relative density (%) | Crystal phase | Hardness (GPa) |
| --- | --- | --- | --- | --- | --- | --- | --- |
| | $ZrO_2$ | ZrC | $B_4C$ | $ZrB_2$ | | | |
| 13 | 1.0 | 1.0 | 1.1 | 0 | 95.2 | $ZrB_2$ | 19.8 |
| C11 | 0 | 0 | 0 | 1.0 | 78.5 | $ZrB_2$ | 11.0 |

It is noted from Table 3 that the sintered body according to the present invention has a higher relative density and hardness than that in Comparative Example.

Figure 3:
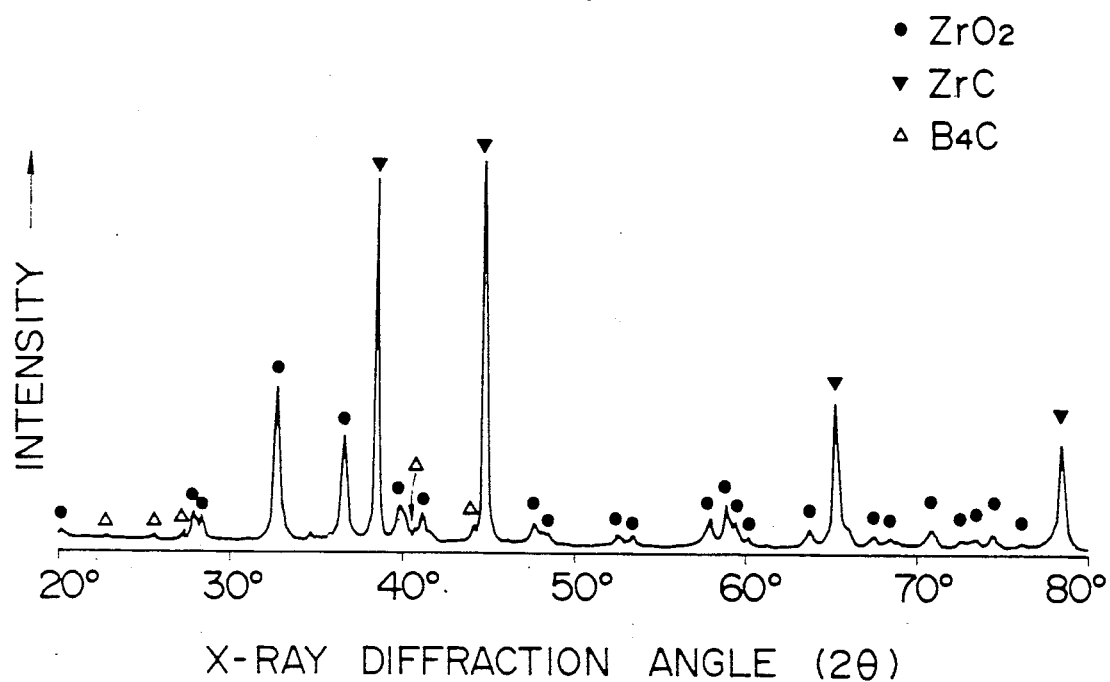
FIG. 3 shows an X-ray diffraction pattern of a powder mixture of $ZrO_2$, $ZrC$, and $B_4C$ used in Example 3.
Figure 4:
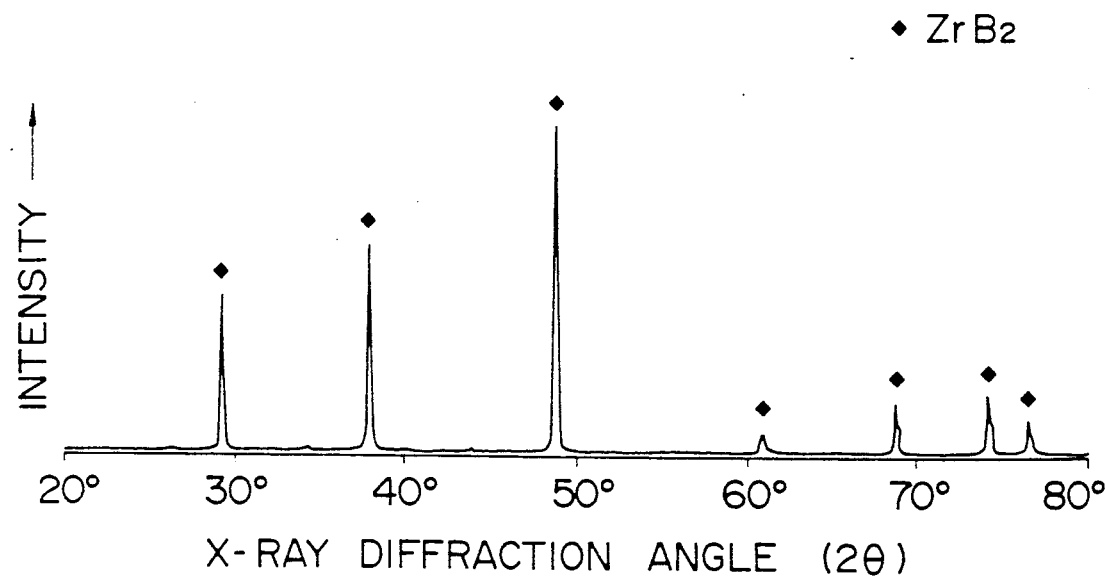
FIG. 4 shows an X-ray diffraction pattern of a sintered body obtained from said mixture.

FIG. 3 is an X-ray diffraction pattern of the raw material composition used for Sample No. 13, and FIG. 4 is an X-ray diffraction pattern of the $ZrB_2$ sintered body produced from said raw material composition. It is noted from the two figures that $ZrB_2$ is synthesized from $ZrO_2$, ZrC, and $B_4C$.

EXAMPLE 4

The raw material compositions were prepared from the components shown in Table 4. The components were mixed using a ball mill containing water as a mixing medium, and the resulting mixture was dried by a spray drier. The $Nb_2O_5$ powder has an average particle diameter of 1.5 μm and NbC powder has an average particle diameter of 2 μm. Other components are identical with those in Examples 1 and 3. The dried powder was hot-pressed in a graphite die at 2000° C. and 20 MPa for 1 hour in an argon atmosphere (1 atm). The compact was heated at 1500° C. for 4 hours while the furnace was evacuated. The temperature was raised again under the pressure of 20 MPa after introduction of argon gas. (Sample Nos. 14 to 17.)

For comparison, sintered bodies were prepared by hot-pressing in the same manner as above from $TiB_2$ powder, $ZrB_2$ powder, $TiB_2 + ZrB_2$ (1:1 by mol) (which are identical with those used in Examples 1 and 3), and $NbB_2$ powder (having an average particle diameter of 3 μm). (Sample Nos. C12 to C15.)

The resulting sintered bodies were examined for relative density, crystal phase, and Vickers hardness in the same manner as in Example 1. The results are shown in Table 4.

It is noted from Table 4 that the sintered bodies according to the present invention have a higher relative density and hardness than those in Comparative Examples.

TABLE 4

| Sample No. | Raw Material Composition (mol) | | | | | Relative density (%) | Crystal phase | Hardness (GPa) |
| --- | --- | --- | --- | --- | --- | --- | --- | --- |
| | Kind | Amount | Kind | Amount | $B_4C$ | | | |
| 14 | $TiO_2$ | 1.0 | TiC | 1.0 | 1.1 | 98.6 | $TiB_2$ | 30.2 |
| 15 | $ZrO_2$ | 1.0 | ZrC | 1.0 | 1.1 | 98.0 | $ZrB_2$ | 22.0 |
| 16 | $ZrO_2$ | 1.0 | TiC | 1.0 | 1.1 | 98.2 | $(Ti,Zr)B_2$ | 26.4 |
| 17 | $Nb_2O_5$ | 0.3 | NbC | 0.8 | 0.77 | 97.6 | $NbB_2$ | 24.7 |
| C12 | $TiB_2$ | | | | | 82.0 | $TiB_2$ | 18.2 |
| C13 | $ZrB_2$ | | | | | 86.2 | $ZrB_2$ | 14.5 |
| C14 | $TiB_2 + ZrB_2$ | | | | | 80.3 | $(Ti,Zr)B_2$ | 15.9 |
| C15 | $NbB_2$ | | | | | 70.6 | $NbB_2$ | 11.2 |

What is claimed is:

1. A process for producing a metal boride sintered body having a density of at least 90% of the theoretical density, which comprises
preparing a raw material composition composed of a metal oxide, a metal carbide, and boron carbide, the amount of said boron carbide being 5 to 20% more than the amount required to provide boron to form a metal boride of a stoichiometric composition by reaction of boron in said boron carbide with the metal element(s) in said metal oxide and metal carbide and sintering said raw material composition, wherein said metal boride is a diboride of the formula $MB_2$ or a pentaboride of the formula $M_2B_5$, wherein M is selected from the group consisting of Ti, Zr, Hf, V, Nb, Ta, Cr, Mo, W, and mixtures thereof.

2. A process according to claim 1, wherein the metal oxide, metal carbide, and boron carbide are in the form of powder having an average particle diameter smaller than 10 um.

3. A process according to claim 1, wherein the raw material composition is molded prior to sintering.

4. A process according to claim 1, wherein the sintering is accomplished by pressureless sintering or pressure sintering.

5. A process according to claim 1, wherein the sintering is accomplished by pressureless sintering, followed by hot isostatic press treatment.

6. A process according to claim 2, wherein the sintering is accomplished in a vacuum or a non-oxidizing atmosphere.

7. A process according to claim 1, wherein the sintering is accomplished at 1700° to 2300° C.

8. A process according to claim 1, wherein said sintering step comprises preheating the raw material composition at 1000° to 1800° C. for at least 1 hour in a vacuum, and
sintering the preheated material.

9. A process according to claim 8, wherein said heating is carried out at 1100° to 1600° C.

10. A process according to claim 1, wherein said sintering step comprises preheating the raw material composition without pressure, and
sintering the preheated material under pressure.

11. A process according to claim 10, wherein said pressure is mechanical pressure or isostatic pressure by inert gas atmosphere.

12. A process according to claim 11, wherein said sintering step comprises preheating the raw material composition at 1100° to 1600° C. for at least one hour, and
sintering the preheated material, in a vacuum or a non-oxidizing atmosphere, at 1700° to 2300° C. for a period of time under mechanical pressure.

13. A process according to claim 11, wherein said sintering step comprises heating the raw material composition at 1100° to 1600° C. for at least one hour,
presintering the preheated material at 1700° to 2300° C. for a period of time in a vacuum or a non-oxidizing atmosphere, and
sintering the presintered material at 1600° to 2300° C. for a period of time under isostatic pressure of inert gas atmosphere.

14. A process according to claim 12, wherein the mechanical pressure is at least 10 MPa.

15. A process according to claim 13, wherein the isostatic pressure is at least 50 MPa.

* * * * *